United States Patent
Alberth et al.

(10) Patent No.: US 8,941,623 B2
(45) Date of Patent: Jan. 27, 2015

(54) METHODS AND DEVICES FOR DETERMINING USER INPUT LOCATION BASED ON DEVICE SUPPORT CONFIGURATION

(75) Inventors: William Alberth, Prairie Grove, IL (US); Dean Thorson, Grayslake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1115 days.

(21) Appl. No.: 12/844,468

(22) Filed: Jul. 27, 2010

(65) Prior Publication Data

US 2012/0026135 A1 Feb. 2, 2012

(51) Int. Cl.
*G06F 3/043* (2006.01)
*G06F 1/16* (2006.01)
*G06F 3/041* (2006.01)
*G06F 3/038* (2013.01)

(52) U.S. Cl.
CPC ............. *G06F 3/0418* (2013.01); *G06F 3/043* (2013.01); *G06F 2203/0381* (2013.01); *G06F 1/1613* (2013.01); *G06F 2200/1636* (2013.01); *G06F 3/038* (2013.01)
USPC ........................................ 345/177; 178/18.04

(58) Field of Classification Search
CPC ..... G06F 3/0418; G06F 3/043; G06F 3/0433; G06F 3/0436; G06F 2200/1636
USPC ..................... 345/173–179; 178/18.01–20.04
See application file for complete search history.

(56) References Cited

U.S. PATENT DOCUMENTS

| | | | |
|---|---|---|---|
| 7,345,677 B2 | 3/2008 | Ing et al. | |
| 7,511,711 B2 | 3/2009 | Ing et al. | |
| 7,649,807 B2 | 1/2010 | Ing | |
| 8,174,547 B2* | 5/2012 | Yoneda et al. | 345/177 |
| 8,319,746 B1* | 11/2012 | Ho et al. | 345/173 |
| 8,378,974 B2* | 2/2013 | Aroyan et al. | 345/173 |
| 8,451,254 B2* | 5/2013 | Bisutti et al. | 345/177 |
| 8,654,524 B2* | 2/2014 | Pance et al. | 361/679.55 |
| 2005/0078093 A1* | 4/2005 | Peterson et al. | 345/173 |
| 2006/0197750 A1* | 9/2006 | Kerr et al. | 345/173 |
| 2006/0244732 A1* | 11/2006 | Geaghan | 345/173 |
| 2006/0262104 A1* | 11/2006 | Sullivan et al. | 345/177 |
| 2007/0075965 A1* | 4/2007 | Huppi et al. | 345/156 |

(Continued)

FOREIGN PATENT DOCUMENTS

WO WO 2008146098 * 12/2008 ............. G06F 3/043

OTHER PUBLICATIONS

International Preliminary Report on Patentability of International application No. PCT/US2011/045274, date issued Jan. 29, 2013, 8 pp.

*Primary Examiner* — Joe H Cheng
*Assistant Examiner* — Keith Crawley
(74) *Attorney, Agent, or Firm* — Shumaker & Sieffert, P.A.

(57) ABSTRACT

Methods and devices are provided for determining location of an input on a surface of a device using a plurality of acoustic sensing elements. An exemplary method comprises determining a current support configuration of the device, selecting a device acoustic signature corresponding to the current support configuration, measuring acoustic response corresponding to the input at each acoustic sensing element of the plurality of acoustic sensing elements, and determining the location of the input based on the measured acoustic responses and the selected device acoustic signature for the current support configuration.

20 Claims, 3 Drawing Sheets

(56) References Cited

U.S. PATENT DOCUMENTS

| | | | |
|---|---|---|---|
| 2008/0316184 A1* | 12/2008 | D'Souza | 345/173 |
| 2009/0116339 A1 | 5/2009 | Ing | |
| 2009/0122028 A1 | 5/2009 | Ing | |
| 2009/0195517 A1 | 8/2009 | Duheille et al. | |
| 2009/0195959 A1* | 8/2009 | Ladouceur et al. | 361/283.1 |
| 2010/0060604 A1* | 3/2010 | Zwart et al. | 345/173 |
| 2010/0116563 A1* | 5/2010 | Paradiso et al. | 178/18.04 |
| 2010/0134423 A1* | 6/2010 | Brisebois et al. | 345/173 |
| 2011/0037734 A1* | 2/2011 | Pance et al. | 345/177 |
| 2011/0261655 A1* | 10/2011 | Aklil et al. | 367/125 |
| 2012/0218195 A1* | 8/2012 | Koh et al. | 345/173 |
| 2013/0057489 A1* | 3/2013 | Morton et al. | 345/173 |
| 2013/0057502 A1* | 3/2013 | Aklil | 345/174 |
| 2013/0194208 A1* | 8/2013 | Miyanaka et al. | 345/173 |
| 2013/0300668 A1* | 11/2013 | Churikov et al. | 345/168 |

\* cited by examiner

METHODS AND DEVICES FOR DETERMINING USER INPUT LOCATION BASED ON DEVICE SUPPORT CONFIGURATION

TECHNICAL FIELD

Embodiments of the subject matter described herein relate generally to touch sensing applications, and more particularly, embodiments of the subject matter relate to using acoustic sensing elements to locate user inputs on a surface of a device based on the current support configuration for the device.

BACKGROUND

Many electronic devices use touch-based interfaces to receive input from the user. Some electronic devices may utilize sensors to detect acoustic waves propagating in the device and determine the location of touch inputs on a surface of the device based on the acoustic waves and known acoustic characteristics of the device, also known as the acoustic signature of the device.

In practice, the acoustic characteristics of the device may change during operation of the device, thereby limiting the ability of the device to accurately determine the location of touch inputs. For example, the acoustic characteristics of a device may change depending on where other objects are contacting the device. Accordingly, it is desirable to accurately determine the location of touch inputs on the surface of an electronic device using acoustic sensing-technologies irrespective of other contact with the device.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. Furthermore, there is no intention to be bound by any expressed or implied theory presented in the preceding technical field, background, or the following detailed description.

For the sake of brevity, conventional techniques related to touch sensing, touch screen calibration and/or configuration, touch screens, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Technologies and concepts discussed herein relate to utilizing acoustic sensing elements to locate user inputs on a surface of a device capable of being held or otherwise gripped in a plurality of possible support configurations. As used herein, a support configuration should be understood as a predefined manner for gripping, holding, mounting, fastening, or otherwise providing physical support to the device. As described in greater detail below, an acoustic signature of the device is obtained for each of the possible support configurations for the device. The device acoustic signature corresponding to the current support configuration of the device is used to resolve or otherwise determine the location of user inputs on a surface of the device based on acoustic responses measured by the acoustic sensing elements of the device, as described in greater detail below.

Figure 1:
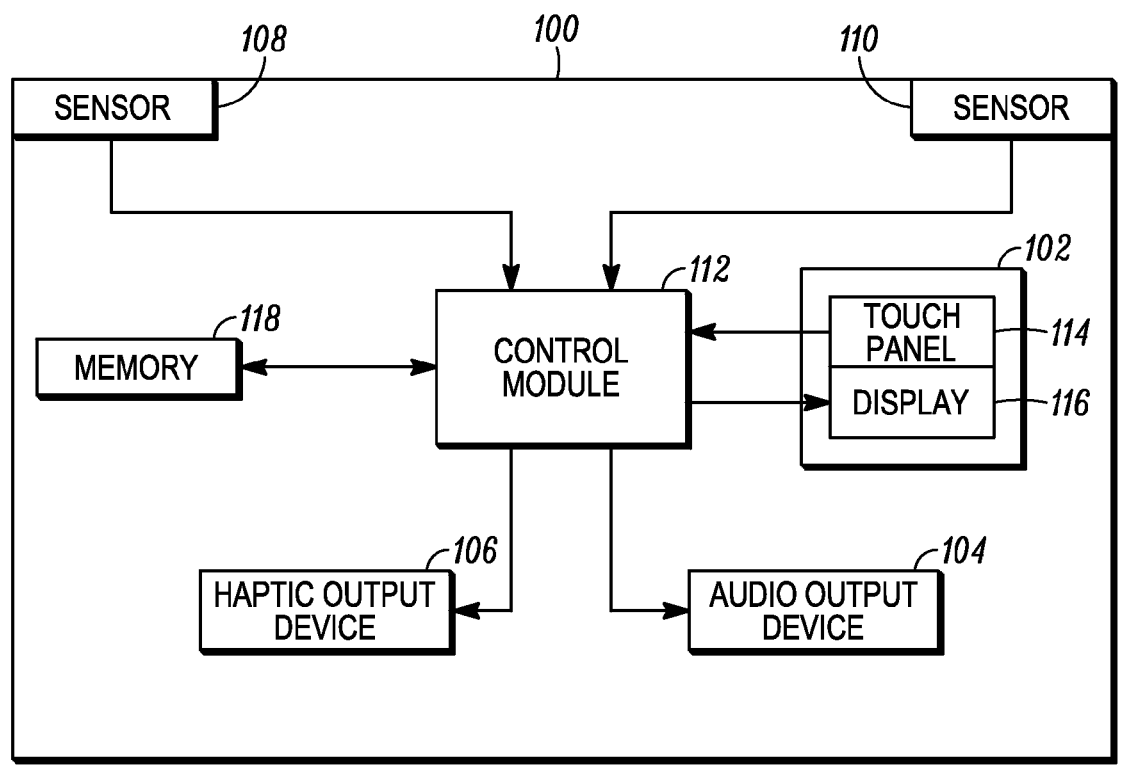
FIG. 1 is a block diagram of an exemplary electronic device in accordance with one embodiment.

FIG. 1 depicts an exemplary embodiment of electronic device 100. The electronic device 100 may be realized as a mobile communications device (e.g., cellular phone, tablet, personal digital assistant, and the like), a computer, a portable media player (e.g., a digital audio player, a digital video player, or the like), or another suitable electronic device capable of being held in a plurality of possible support configurations. In an exemplary embodiment, the electronic device 100 includes, without limitation, a touch screen 102, one or more nonvisual output components 104, 106, a plurality of acoustic sensing elements 108, 110, a control module 112, and a suitable amount of memory 118. It should be understood that FIG. 1 is a simplified representation of an electronic device 100 for purposes of explanation and is not intended to limit the scope of the subject matter in any way. In this regard, although FIG. 1 depicts the electronic device 100 including two acoustic sensing elements 108, 110, practical embodiments of the electronic device 100 may include additional or fewer acoustic sensing elements to satisfy the needs of a particular application.

In an exemplary embodiment, the acoustic sensing elements 108, 110 measure, sense, detect, or otherwise obtain acoustic responses attributable to user input(s) on a surface of the electronic device 100. As used herein, a user input comprises an impact, tap, stroke, movement, marking, or the like, that is imparted by a user of the electronic device 100 to a surface of the electronic device 100, for example, by applying and/or pressing an input object (e.g., a finger, stylus, digital pen, or the like) to the surface of the electronic device 100. The contact between the input object and the electronic device 100 results in acoustic waves propagating throughout the electronic device 100 that influence the acoustic responses measured by the acoustic sensing elements 108, 110. In this regard, a measured acoustic response by an acoustic sensing element 108, 110 corresponds to the amplitude and frequency (or phase) of the acoustic waves sensed or detected by the respective acoustic sensing element 108, 110 at its respective location. In an exemplary embodiment, the measured acoustic response is an electrical signal provided by a respective sensing element 108, 110 to the control module 112 that reflects the amplitude and frequency (or phase) characteristics of the resulting acoustic waves at the location of the respective sensing element 108, 110. The measured acoustic response varies with respect to the location of the user input, and thus, measured acoustic responses may be utilized by the control module 112 to determine or otherwise resolve the location of contact between an input object and a surface of the electronic device 100, that is, the input location of a } respective user input on the surface of the electronic device 100, as described in greater detail below.

The touch screen 102 provides a user interface with the electronic device 100 and includes a touch panel 114 and a display device 116. The touch panel 114 is realized as a transparent touch panel that is responsive to user input on the surface of touch panel 114. Depending on the embodiment, the touch panel 114 may be realized as a resistive touch panel or a capacitive touch panel, or the touch panel 114 may be realized using another suitable technology. The touch panel 114 is coupled to the control module 112, wherein the control module 112 is configured to resolve user input on the touch panel 114 to its corresponding location on the touch panel 114. The touch panel 114 is preferably disposed proximate the display device 116 and aligned with respect to the display device 116 such that the touch panel 114 is interposed in the line-of-sight between a user and the display device 116 when the user views content displayed on the display device 116. In this regard, from the perspective of a user and/or viewer of the touch screen 102 and/or display device 116, at least a portion of the touch panel 114 overlaps and/or overlies content displayed on the display device 116. In accordance with one embodiment, the touch panel 114 is substantially planar in shape and disposed adjacent to a substantially planar surface of the display device 116. For example, if the display device 116 has a substantially planar viewing area, the touch panel 114 may be aligned parallel to the planar viewing area of the display device 116. In accordance with one or more embodiments, the touch panel 114 is integral with the display device 116.

The display device 116 is realized as an electronic display configured to graphically display information and/or content under control of the control module 112. Depending on the embodiment, the display device 116 may be realized as a liquid crystal display (LCD), a cathode ray tube display (CRT), a light emitting diode (LED) display, an organic light emitting diode (OLED) display, a plasma display, or another suitable electronic display. The control module 112 is coupled to the display device 116, and the control module 112 controls the display and/or rendering of content on the display device 116 and correlates the location of a user input received on the touch panel 114 with the location of content displayed on the display device 116.

The nonvisual output components 104, 106 generally represent the components of the electronic device 100 configured to generate nonvisual feedback to a user of the electronic device 100 under control of the control module 112. In this regard, in an exemplary embodiment, the electronic device 100 includes an audio output device 104 and a haptic output device 106. The audio output device 104 may be realized as a speaker or another device configured to produce or otherwise generate auditory output in response to commands from the control module 112. The haptic output device 106 may be realized as a vibrator or another device configured to produce or otherwise generate haptic output in response to commands from the control module 112.

As illustrated by FIG. 1, the electronic device 100 includes at least two acoustic sensing elements 108, 110 that are disposed at different locations within the electronic device 100. In an exemplary embodiment, the acoustic sensing elements 108, 110 are in contact with a surface of the electronic device 100 that is intended to receive user input. In addition to being disposed at different locations, the acoustic sensing elements 108, 110 are also separated from each other by a distance that ensures decorrelation between the measured acoustic responses at the respective sensing elements 108, 110 resulting from a user input on a surface of the electronic device 100.

In other words, the separation distance ensures that the measured acoustic responses at the respective sensing elements 108, 110 are equal for no more than one input location on the surface of the electronic device 100. In an exemplary embodiment, the acoustic sensing elements 108, 110 are realized as piezoelectric sensors configured to measure, sense, detect, or otherwise obtain the acoustic response resulting from or otherwise attributable to a user input on a surface of the electronic device 100 and provide an electrical signal indicative of the acoustic response to the control module 112, as described in greater detail below. Accordingly, for convenience and ease of explanation, but without limitation, the acoustic sensing elements 108, 110 may alternatively be referred to herein as sensors.

The control module 112 generally represents the hardware, software, and/or firmware components configured to determine or otherwise resolve the input location corresponding to user input, either on the touch screen 102 or a surface of the electronic device 100, and perform additional tasks and/or functions described in greater detail below. The control module 112 also includes or otherwise accesses memory 118 capable of maintaining a plurality of device acoustic signatures for the electronic device 100, as described in greater detail below.

Depending on the embodiment, the control module 112 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The control module 112 may also be implemented as a combination of computing devices, e.g., a combination of a digital signal processor and a microprocessor, a plurality of microprocessors, one or more microprocessors in conjunction with a digital signal processor core, or any other such configuration. In practice, the control module 112 includes processing logic that may be configured to carry out the functions, techniques, and processing tasks associated with the operation of the electronic device 100, as described in greater detail below. Furthermore, the steps of a method or algorithm described in connection with the embodiments disclosed herein may be embodied directly in hardware, in firmware, in a software module executed by the control module 112, or in any practical combination thereof.

In an exemplary embodiment, the control module 112 and the sensors 108, 110 are cooperatively configured to obtain an acoustic signature for the electronic device 100, alternatively referred to herein as a device acoustic signature. As described in greater detail below, a device acoustic signature includes an acoustic signature for each respective sensor 108, 110 that reflects the acoustic responses measured by the respective sensor 108, 110 (or the electrical signals produced or provided by the respective sensor 108, 110) resulting from user inputs at known locations on the surface of the electronic device 100.

In an exemplary embodiment, each device acoustic signature is associated with a particular support configuration for the electronic device 100. As set forth above, a support configuration should be understood as a predefined manner for gripping, holding, mounting, fastening, or otherwise providing physical support to the electronic device 100. In this regard, a support configuration corresponds to persistent physical contact points on one or more surfaces of the electronic device 100 that do not correspond to user inputs, but rather, provide substantially fixed mechanical support for the electronic device 100. For example, a first support configuration may correspond to a user holding the electronic device 100 to the user's left ear with the user's left hand, a second support configuration may correspond to the user holding the electronic device 100 to the user's right ear with the user's right hand, a third support configuration may correspond to the user holding the electronic device 100 in front of the user (e.g., the provide input to the electronic device 100), a fourth support configuration may correspond to the electronic device 100 being held or gripped by a mounting apparatus or support structure (e.g., a dock, cradle, holder, or the like), and so on.

As set forth above, a user input on a surface of the electronic device 100 produces a pattern of acoustic waves propagating through the electronic device 100. The physical contact points on the surface(s) of the electronic device 100 provided by a respective support configuration affect the acoustic characteristics of the electronic device 100, and thereby influence the manner in which acoustic waves propagate through the electronic device 100 (e.g., the manner in which the acoustic waves are attenuated) in response to the user input. Acoustic waves resulting from the user input produce a measurable acoustic response at each of the sensors 108, 110, and the amplitude and/or frequency characteristics of the acoustic response are influenced by the support configuration of the electronic device 100 and vary with respect to the location of the user input. Thus, each sensor 108, 110 has an acoustic signature for a particular support configuration that corresponds to a mapping between the measured acoustic responses and the known input locations for user inputs provided on a surface of the electronic device 100 while the electronic device 100 was in the particular support configuration, wherein the user inputs at the known input locations produce the corresponding measured acoustic responses.

In an exemplary embodiment, the control module 112 obtains a device acoustic signature for each of the possible support configurations for the electronic device 100, and stores or otherwise maintains the association between the support configuration and its corresponding device acoustic signature (e.g., the set of acoustic signatures for the sensors 108, 110 when the electronic device 100 is in the associated support configuration). For example, a first device acoustic signature for a first support configuration may be obtained by applying a series of impulse-style inputs having known input locations across one or more surfaces of the electronic device 100 while the electronic device 100 is maintained in the first support configuration, and the association between the known input locations and the measured acoustic responses at each sensor 108, 110 stored or otherwise maintained by the control module 112 as the device acoustic signature for a particular support configuration. For example, the electronic device 100 may be fixedly held or gripped in a first support configuration, and a series of inputs having known locations ($L_1, L_2, L_3 \ldots L_n$) applied across one or more surfaces of the electronic device 100. In an exemplary embodiment, at least some of the known input locations correspond to locations on the touch panel 114 and/or touch screen 102. In response to each known input, the first sensing element 108 obtains a measured acoustic response and provides an electrical signal indicative of the acoustic response at the location of the first sensing element 108 to the control module 112. The control module 112 obtains the acoustic signature for the first sensing element 108 by maintaining the association between the set of acoustic responses measured by the first sensing element 108 ($A_1, A_2, A_3 \ldots A_n$) and the known input locations ($L_1$-$L_n$). Similarly, in response to each known input, the second sensing element 110 obtains a measured acoustic response and provides an electrical signal indicative of the acoustic response at the location of the second sensing element 110 to the control module 112. The control module 112 obtains the acoustic signature for the second sensing element 110 by maintaining the association between the set of acoustic responses measured by the second sensing element 110 ($B_1, B_2, B_3 \ldots B_n$) and the known input locations. The control module 112 obtains or otherwise determines the device acoustic signature for the first support configuration as the association between the known input locations ($L_1$-$L_n$) and the measured acoustic responses ($A_1$-$A_n$, $B_1$-$B_n$) at the sensors 108, 110. In an exemplary embodiment, the control module 112 and the sensors 108, 110 are cooperatively configured to obtain and maintain device acoustic signatures for one or more of the following support configurations: a user holding the electronic device 100 with a vertical orientation in his or her left hand (e.g., a left-handed vertical support configuration), a user holding the electronic device 100 with a vertical orientation in his or her right hand (e.g., a right-handed vertical support configuration), a user holding the electronic device 100 with a horizontal orientation in his or her left hand (e.g., a left-handed horizontal support configuration), a user holding the electronic device 100 with a horizontal orientation in his or her right hand (e.g., a right-handed horizontal support configuration), a support structure (e.g., a cell phone holder, a car mount, or the like) holding the electronic device 100 with a vertical orientation (e.g., a vertically-mounted support configuration), or a support structure holding the electronic device 100 with a horizontal orientation (e.g., a horizontally-mounted support configuration). As described in greater detail below, during operation of the electronic device 100, the device acoustic signature corresponding to the current support configuration of the electronic device 100 is used to resolve or otherwise determine the input locations for user inputs on a surface of the electronic device 100.

Figure 2:
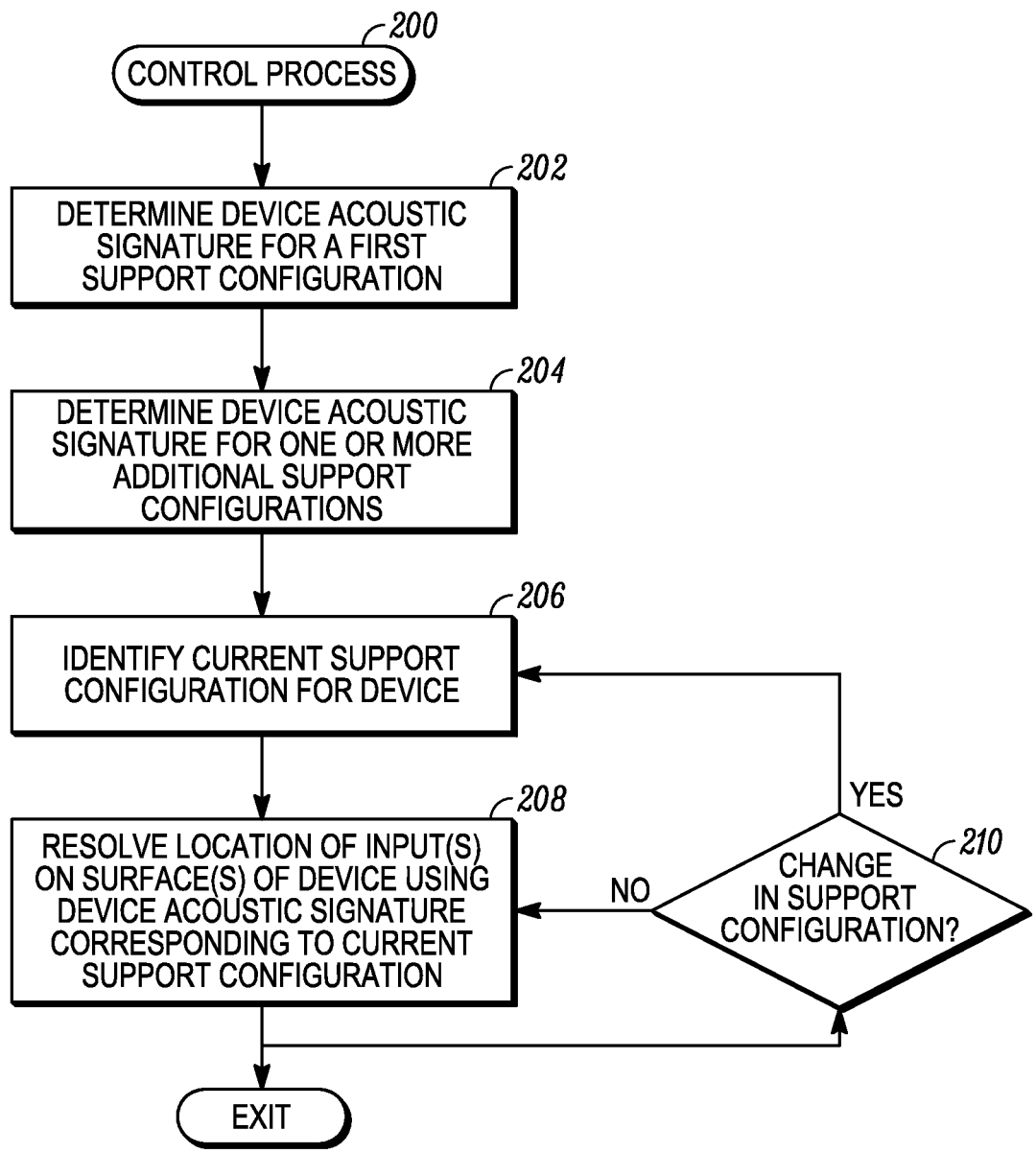
FIG. 2 is a flow diagram of a control process suitable for use with the electronic device of FIG. 1 in accordance with one embodiment.

Referring now to FIG. 2, in an exemplary embodiment, an electronic device may be configured to perform a control process 200 and additional tasks, functions, and/or operations as described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the touch screen 102, the sensors 108, 110, the control module 112, the touch panel 114 and/or display device 116. It should be appreciated any number of additional or alternative tasks may be included, and may be incorporated into a more comprehensive procedure or process having additional functionality not described in detail herein.

Referring to FIG. 2, and with continued reference to FIG. 1, the control process 200 may be performed to enable the electronic device 100 to more accurately resolve the locations of user inputs imparted to a surface of the electronic device 100 using acoustic sensors 108, 110. The control process 200 begins by determining a first device acoustic signature for a first support configuration (task 202). In this regard, the acoustic signature of the electronic device 100 for the first support configuration may be determined by placing the electronic device 100 in the first support configuration, and applying a series of impulse-style inputs having known locations across one or more surfaces of the electronic device 100 while the electronic device 100 is maintained in the first support configuration, as described above. For example, the electronic device 100 may be fixedly held or gripped with a vertical orientation, either by the left hand of a user or another support structure (e.g., a dock, cradle, holder, holster, or another mounting apparatus) that provides persistent physical contact to simulate the electronic device 100 being held vertically by a left hand of a user, and a series of inputs having known locations applied across one or more surfaces of the electronic device 100. As described above, the control module 112 maintains the association between the known input locations ($L_1$-$L_n$) and the resulting measured acoustic responses at the first sensor 108 ($A_1$-$A_n$) as the acoustic signature for the first sensor 108 for the left-handed vertical support configuration, and similarly, maintains the association between the known input locations ($L_1$-$L_n$) and the measured acoustic responses at the second sensor 110 ($B_1$-$B_n$) as the acoustic signature for the second sensor 110 for the left-handed vertical support configuration. The set of acoustic signatures for the sensors 108, 110 for the left-handed vertical support configuration comprise the device acoustic signature for the electronic device 100 (e.g., the association between known input locations ($L_1$-$L_n$) and their corresponding set of measured acoustic responses ($A_1$-$A_n$, $B_1$-$B_n$) for the left-handed vertical support configuration) that is associated with the left-handed vertical support configuration. The device acoustic signature and its association with the left-handed vertical support configuration may be stored or otherwise maintained by the control module 112 in memory 118.

In an exemplary embodiment, the control process 200 continues by determining device acoustic signatures for one or more additional support configurations (task 204). For example, a device acoustic signature for the electronic device 100 in the right-handed vertical support configuration may be determined by fixedly holding or gripping the electronic device 100 with a vertical orientation, either by the right hand of user or another object that provides persistent physical contact points to simulate the electronic device 100 being held vertically by a right hand of a user, and a series of inputs having known locations applied across one or more surfaces of the electronic device 100. The control module 112 and/or memory 118 maintains the association between the right-handed vertical support configuration and the device acoustic signature (e.g., the set of acoustic signatures for the sensors 108, 110 for the right-handed vertical support configuration), in a similar manner as described above. Similarly, the electronic device 100 may be fixedly held or gripped with physical contact points corresponding to a horizontal orientation with a left-handed or right-handed configuration to obtain acoustic signatures for the sensors 108, 110 for a right-handed horizontal support configuration and/or a left-handed horizontal support configuration. Additionally, the electronic device 100 may be placed in other mounting apparatus or support structures (e.g., a cell phone holder, a car mount, or the like) and acoustic signatures obtained for sensors 108, 110 with the electronic device 100 in various mounted support configurations.

In an exemplary embodiment, the control process 200 continues by determining or otherwise identifying the current support configuration for the electronic device during operation of the device and resolving input locations for subsequent user inputs on a surface of the device using the device acoustic signature corresponding to the current support configuration (tasks 206, 208). In accordance with one embodiment, the control module 112 identifies the current support configuration of the electronic device 100 by correlating measured input locations for user inputs on the touch screen 102 and/or touch panel 114 to input locations determined using the device acoustic signatures for the various support configurations maintained by the control module 112, as described in greater detail below in the context of FIG. 3. In response to identifying the current support configuration of the electronic device 100, the control module selects the device acoustic signature corresponding to the current support configuration for use in resolving input locations for user inputs based on measured acoustic responses obtained from sensors 108, 110. The control module 112 obtains measured acoustic responses from sensors 108, 110 ($A_m$, $B_m$) that are attributable to a user input on a surface of the electronic device 100 and determines the location of the user input based on the selected device acoustic signature corresponding to the current support configuration. In this regard, the control module 112 compares the entire set of stored acoustic responses ($A_1$-$A_n$, $B_1$-$B_n$) for the current support configuration to the measured acoustic responses ($A_m$, $B_m$), identifies the set of stored acoustic responses ($A_i$, $B_i$) from the entire set of stored acoustic responses ($A_1$-$A_n$, $B_1$-$B_n$) for the current support configuration that are closest to the measured acoustic responses ($A_m$, $B_m$), and determines the location of the user input as the known input location ($L_i$) corresponding to the set of stored acoustic responses ($A_i$, $B_i$) that are closest to the measured acoustic responses ($A_m$, $B_m$). In this manner, the device acoustic signature that corresponds to the current support configuration of the electronic device 100 is used to determine the location of user input on the surface of the electronic device 100.

In accordance with one embodiment, the control process 200 continues by detecting or otherwise determining whether there has been a change in the support configuration for the electronic device (task 210). For example, in one embodiment, the control module 112 may identify a change in the support configuration for the electronic device 100 by determining that a user input location determined a device acoustic signature for another support configuration more closely match a user input location determined using the touch screen 102 and/or touch panel 114, as described in greater detail below in the context of FIG. 3. In other embodiments, the control module 112 may identify a change in the support configuration for the electronic device 100 using other means. For example, the electronic device 100 may include an accelerometer or gyroscope that indicates when the change (or a rate of change) in the orientation of the electronic device 100 exceeds a threshold amount. In response to determining a change in the support configuration of the electronic device, the control process 200 repeats the step of identifying the current support configuration for the electronic device. Otherwise, if the support configuration for the electronic device is unchanged, the control process 200 continues resolving input locations for subsequent user inputs on the surface of the electronic device 100 using the device acoustic signature corresponding to the previously identified support configuration. The loop defined by tasks 206, 208 and 210 may repeat as desired throughout operation of the electronic device 100.

Figure 3:
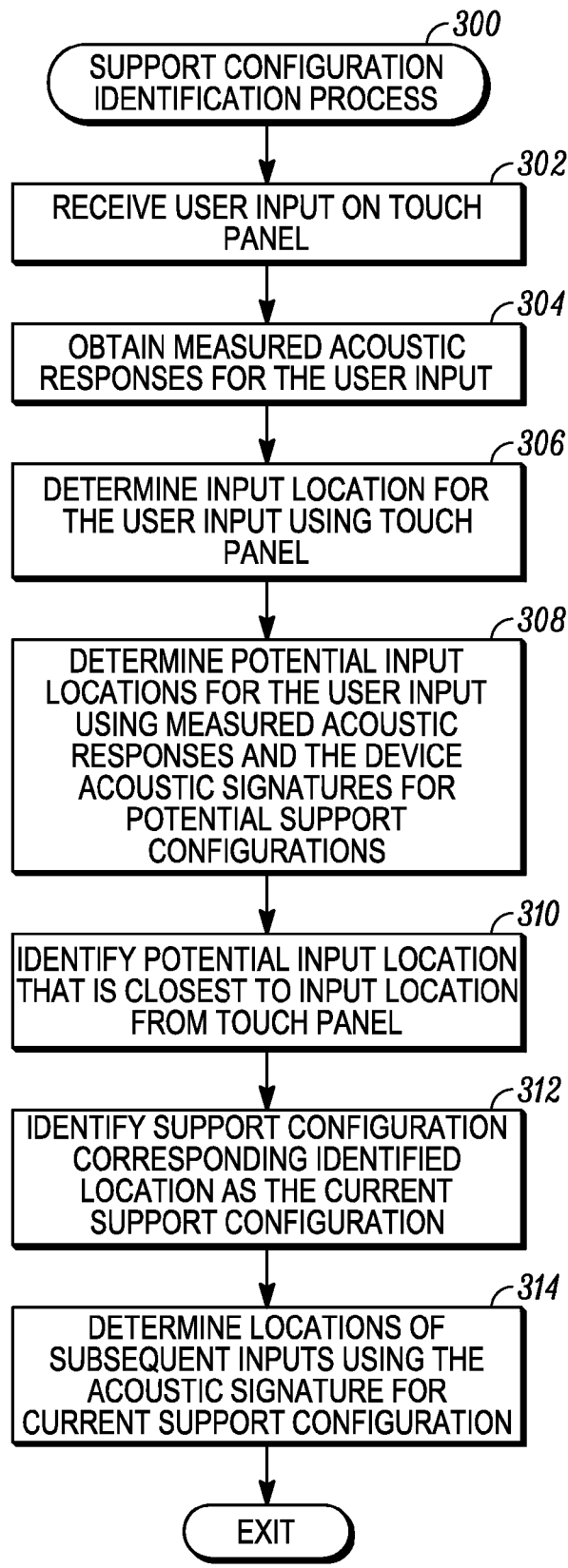
FIG. 3 is a flow diagram of a support configuration identification process suitable for use with the electronic device of FIG. 1 or the control process of FIG. 2 in accordance with one or more embodiments.

Referring now to FIG. 3, in an exemplary embodiment, an electronic device may be configured to perform a support configuration identification process 300 and additional tasks, functions, and/or operations as described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the touch screen 102, the sensors 108, 110, the control module 112, the touch panel 114 and/or display device 116. It should be appreciated any number of additional or alternative tasks may be included, and may be incorporated into a more comprehensive procedure or process having additional functionality not described in detail herein.

Referring to FIG. 3, and with continued reference to FIGS. 1-2, the support configuration identification process 300 may be performed to enable the electronic device 100 to determine its current support configuration. The support configuration identification process 300 begins by receiving or otherwise obtaining an initial user input on a touch panel and obtaining measured acoustic responses at a plurality of acoustic sensing elements in response to the initial user input on the touch panel (tasks 302, 304). In this regard, each sensor 108, 110 measures, senses, or otherwise detects the acoustic response ($A_m$, $B_m$) at its respective location that is attributable to the initial user input on the touch panel 114 and/or touch screen 102, resulting in measured acoustic responses for the initial user input. The support configuration identification process 300 continues by determining the location of the initial user input on the touch panel (task 306). In this regard, the control module 112 receives signals from the touch panel 114 and/or touch screen 102 indicative of the location of the user input and determines the location of the user input on the touch panel 114 and/or touch screen 102 in a conventional manner. The location of the initial user input on the touch panel 114 ($L_T$) corresponds to a verified input location for the initial user input that is used to determine a best fit support configuration of the plurality of possible support configurations for the electronic device 100, as described in greater detail below.

In an exemplary embodiment, the support configuration identification process 300 continues by determining a plurality of possible input locations for the initial user input using the measured acoustic responses corresponding to the initial user input and the device acoustic signatures for the possible support configurations for the electronic device (task 308). In this regard, for each possible support configuration having a corresponding device acoustic signature maintained by the control module 112, the control module 112 determines a possible input location for the initial user input using the measured acoustic responses attributable to the initial user input and the acoustic signatures for the sensors 108, 110 for that respective support configuration. For example, the control module 112 may determine a first possible input location ($L_{LV}$) using the measured acoustic responses and acoustic signatures for the sensors 108, 110 corresponding to the left-handed vertical support configuration (e.g., the left-handed vertical grip input location) in a similar manner as described above. In this regard, the control module 112 compares the entire set of stored acoustic responses ($A_1$-$A_n$, $B_1$-$B_n$) for the left-handed vertical support configuration to the measured acoustic responses ($A_m$, $B_m$), identifies the set of stored acoustic responses ($A_i$, $B_i$) from the entire set of stored acoustic responses ($A_i$, $B_i$) for the left-handed vertical support configuration that are closest to the measured acoustic responses ($A_m$, $B_m$), and determines the left-handed vertical grip input location ($L_{LV}$) as the known input location ($L_i$) corresponding to the set of stored acoustic responses ($A_i$, $B_i$) that are closest to the measured acoustic responses ($A_m$, $B_m$). Similarly, the control module 112 may determine a right-handed vertical grip input location ($L_{RV}$) by comparing the entire set of stored acoustic responses ($A_1$-$A_n$, $B_1$-$B_n$) for the right-handed vertical support configuration to the measured acoustic responses ($A_m$, $B_m$), identifying the set of stored acoustic responses ($A_i$, $B_i$) from the entire set of stored acoustic responses ($A_i$, $B_i$) for the right-handed vertical support configuration that are closest to the measured acoustic responses ($A_m$, $B_m$), and determines the right-handed vertical grip input location ($L_{RV}$) as the known input location ($L_i$) corresponding to the set of stored acoustic responses ($A_i$, $B_i$) that are closest to the measured acoustic responses ($A_m$, $B_m$). In this manner, the control module 112 determines additional possible input locations using the measured acoustic responses and acoustic signatures for the sensors 108, 110 corresponding to other possible support configurations (e.g., a right-handed horizontal grip input location, a left-handed horizontal grip input location, a vertically-mounted grip input location, a horizontally-mounted grip input location, and the like).

In an exemplary embodiment, the support configuration identification process 300 continues by identifying or otherwise determining the possible input location that is closest to the actual input location for the initial user input, and identifying the support configuration corresponding to the identified possible input location as the current support configuration for the electronic device (tasks 310, 312). The possible input location that is closest to the actual input location for the initial user input (or the most accurate possible input location) corresponds to a best fit input location for the initial user input determined using the acoustic sensors 108, 110, and the support configuration associated with the device acoustic signature used to determine the best fit input location corresponds to a best fit support configuration corresponding to the current support configuration of the electronic device 100. In an exemplary embodiment, for each possible input location of the plurality of possible input locations, the control module 112 calculates or otherwise determines a difference metric that corresponds to the difference between the respective possible input location and the verified input location determined using the touch panel 114. For example, the control module 112 may determine the magnitude of the difference between the verified input location and each respective possible input location. The control module 112 identifies the possible input location having the lowest value for the difference metric as the best fit input location for the initial user input. For example, the control module 112 may determine the magnitude of the difference between the verified input location ($L_T$) from the touch panel 114 and/or touch screen 102 and the left-handed vertical grip input location ($L_{LV}$) and determine the magnitude of the difference between the verified input location ($L_T$) and the right-handed vertical grip input location ($L_{RV}$). When the difference between the verified input location and the left-handed vertical grip input location is less than the difference between the verified input location and the right-handed vertical grip location (i.e., the device acoustic signature for the left-handed vertical support configuration results in the possible input location that is closest to the verified input location of the initial user input on the touch panel 114), the control module 112 identifies the left-handed vertical support configuration as the current support configuration for the electronic device 100. Similarly, if the device acoustic signature for the right-handed vertical support configuration results in the possible input location that is closest to the verified input location, the control module 112 identifies the right-handed vertical support configuration as the current support configuration for the electronic device 100. Likewise, if the device acoustic signature for the another support configuration (e.g., a right-handed horizontal grip input location, a left-handed horizontal grip input location, a vertically mounted grip input location, a horizontally mounted grip input location, or the like) result in the possible input location that is closest to the verified input location, the control module 112 identifies that respective support configuration as the current support configuration for the electronic device 100. In this manner, the control module 112 may determine the current hand of the user that is holding the electronic device 100 as well as the current orientation of the electronic device 100 based on the relationship between the possible input locations and the verified input location from the touch panel 114.

After identifying the current support configuration for the electronic device, the support configuration identification process 300 continues by determining or otherwise resolving the input locations for subsequent user inputs on a surface of the electronic device using the device acoustic signature for the current support configuration (task 314). In this regard, the control module 112 selects the device acoustic signature corresponding to the current support configuration of the electronic device 100, and in response to subsequent user inputs on the surface of the electronic device 100, the control module 112 obtains measured acoustic responses from the sensors 108, 110 and determines the input locations for the subsequent user inputs using the measured acoustic responses and the selected device acoustic signature (e.g., the acoustic signatures for the sensors 108, 110 for the current support configuration). In this manner, the control module 112 may select the device acoustic signature corresponding to the current hand of the user holding the electronic device 100 with the current orientation of the electronic device 100 for use in determining the location of user inputs on a surface of the electronic device 100. As described above, the control module 112 obtains measured acoustic responses from the sensors 108, 110 and determines the input locations for subsequent user inputs using the measured acoustic responses and the acoustic signatures for the sensors 108, 110 for the current support configuration in a similar manner as described above (e.g., comparing the entire set of stored acoustic responses for the identified current support configuration to the measured acoustic responses, identifies the set of stored acoustic responses closest to the measured acoustic responses, and determining the location of the user input as the known input location corresponding to the identified set of stored acoustic responses) throughout operation of the electronic device 100 until identifying or otherwise detecting a change in the support configuration of the electronic device 100.

In response to detecting a change in the support configuration, the support configuration identification process 300 may repeat to update or otherwise identify the new support configuration of the electronic device as described above in the context of FIG. 2 (e.g., tasks 206, 210). As set forth above, the control module 112 may identify a change in the support configuration for the electronic device 100 by determining that a user input location determined a device acoustic signature for another support configuration more closely match a user input location determined using the touch screen 102 and/or touch panel 114. In this regard, each time a user input is received on the touch screen and/or touch panel 114, the control module 112 may repeat the steps of determining a plurality of possible input locations for the user input using the device acoustic signatures for the possible support configurations for the electronic device 100, determining the possible input location that is closest to the actual input location for the user input, and identifying the support configuration corresponding to the identified possible input location (e.g., tasks 308, 310, 312). When the support configuration corresponding to the best fit input location is different from the previously identified support configuration of the electronic device 100, the control module 112 detects or otherwise determines a change in the support configuration of the electronic device 100 and uses the device acoustic signature for the best fit input location to resolve the input location of subsequent user inputs on the surface of the electronic device 100.

To briefly summarize, one advantage of the methods described above is that the device acoustic signature that reflects the physical contact points on the electronic device may be utilized to resolve the location of user input determined using measured acoustic responses. In this manner, the effect that the physical contact points have on the acoustic characteristics of the electronic device are accounted for, and allow the location of user input that does not overly a touch screen and/or touch panel to be resolved more accurately.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, the terms "first", "second" and other such numerical terms referring to structures do not imply a sequence or order unless clearly indicated by the context.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for determining a location of an input on a surface of a device, the location determined using a plurality of acoustic sensing elements, the method comprising:
   determining a current support configuration of the device from a plurality of possible support configurations for the device, each possible support configuration having a respective device acoustic signature used to resolve the location of the input on the surface of the device;
   selecting a device acoustic signature corresponding to the current support configuration;
   obtaining at each acoustic sensing element of the plurality of acoustic sensing elements a measured acoustic response corresponding to the input, resulting in measured acoustic responses for the input; and determining the location of the input based on the measured acoustic responses and the selected device acoustic signature for the current support configuration.

2. The method of claim 1, wherein determining the current support configuration comprises identifying a best fit support configuration from the plurality of possible support configurations for the device.

3. The method of claim 1, the input being provided by a user, wherein determining the current support configuration of the device comprises determining a hand of the user currently holding the device.

4. The method of claim 3, wherein:
selecting the device acoustic signature corresponding to the current support configuration comprises selecting acoustic signatures for the respective acoustic sensing elements corresponding to the hand currently holding the device; and
determining the location of the input comprises determining the location of the input based on the measured acoustic response at a respective acoustic sensing element and the selected acoustic signature for the respective acoustic sensing element.

5. The method of claim 3, wherein determining the current support configuration of the device further comprises determining a current orientation for the device.

6. The method of claim 5, wherein:
selecting the device acoustic signature corresponding to the current support configuration comprises selecting acoustic signatures for the respective acoustic sensing elements corresponding to the hand currently holding the device with the current orientation; and
determining the location of the input comprises determining the location of the input based on the measured acoustic response at a respective acoustic sensing element and the selected acoustic signature for the respective acoustic sensing element.

7. The method of claim 1, wherein determining the current support configuration of the device comprises determining the current support configuration based on a verified input location for the input.

8. The method of claim 7, wherein determining the current support configuration comprises:
determining a plurality of possible input locations for the input using the measured acoustic responses and the device acoustic signatures for the possible support configurations;
identifying a best fit possible input location of the plurality of possible input locations closest to the verified input location; and
identifying a best fit support configuration corresponding to the best fit possible input location as the current support configuration.

9. The method of claim 8, the device including a touch panel having the input provided thereon, wherein determining the current support configuration of the device further comprises determining the verified input location using the touch panel.

10. A device comprising:
a plurality of acoustic sensing elements; and
a control module coupled to the plurality of acoustic sensing elements, wherein the control module is configured to:
identify a current support configuration for the device from a plurality of possible support configurations for the device, each possible support configuration having a respective device acoustic signature used to resolve a location of an input on a surface of the device;
obtain measured acoustic responses from the plurality of acoustic sensing elements corresponding to an input on a surface of the device, the measured acoustic responses comprising a measured acoustic response corresponding to the input at each acoustic sensing element of the plurality of acoustic sensing elements; and
determine the location of the input based on the measured acoustic responses and a device acoustic signature corresponding to the current support configuration.

11. The device of claim 10, further comprising a touch panel coupled to the control module, the input overlying the touch panel, wherein the control module is configured to:
determine an input location for the input using the touch panel; and
identify the current support configuration based on the input location.

12. The device of claim 10, wherein the control module is configured to:
determine possible input locations for the input using the measured acoustic responses and the device acoustic signatures for the possible support configurations; and
identify a best fit support configuration corresponding to a best fit input location of the possible input locations as the current support configuration.

13. The device of claim 12, further comprising a touch panel coupled to the control module, the input overlying the touch panel, wherein the control module is configured to:
determine a verified input location for the input using the touch panel; and
identify the best fit input location based on differences between the possible input locations and the verified input location.

14. The device of claim 10, wherein the control module is configured to identify the current support configuration for the device by determining a hand of a user providing the input that is currently holding the device.

15. The device of claim 14, wherein identifying the current support configuration further comprises determining a current orientation for the device.

16. The device of claim 15, wherein the control module is configured to determine the location of the input based on the measured acoustic responses and a device acoustic signature corresponding to the hand of the user currently holding the device with the current orientation.

17. A method for resolving inputs on a surface of a device capable using a plurality of acoustic sensing elements, the device including the plurality of acoustic sensing elements, the method comprising:
obtaining a first device acoustic signature corresponding to a first support configuration for the device, the first device acoustic signature reflecting first acoustic responses measured by respective acoustic sensing elements of the plurality of acoustic sensing elements resulting from first known inputs at known first locations on the surface of the device while the device was held in the first support configuration;
obtaining a second device acoustic signature corresponding to a second support configuration for the device, the second device acoustic signature reflecting second acoustic responses measured by respective acoustic sensing elements of the plurality of acoustic sensing elements resulting from second known inputs at known second locations on the surface of the device while the device was held in the second support configuration;

determining a first input location for a first input on the surface of the device using the first device acoustic signature;

determining a second input location for the first input using the second device acoustic signature;

obtaining a verified location for the first input; and when a difference between the first input location and the verified location is less than a difference between the second input location and the verified location, determining a second input location for a subsequent input on the surface of the device using the first device acoustic signature.

18. The method of claim 17, the first input being imparted on a touch panel of the device, wherein obtaining the verified location for the first input comprises determining a third input location for the first input using the touch panel.

19. The method of claim 17, further comprising obtaining a measured acoustic response resulting from the first input at each acoustic sensing element of the plurality of acoustic sensing elements, wherein:

determining the first input location comprises determining the first input location using the first device acoustic signature and the measured acoustic response at each acoustic sensing element; and determining the second input location comprises determining the second input location using the second device acoustic signature and the measured acoustic response at each acoustic sensing element.

20. The method of claim 19, further comprising obtaining a second measured acoustic response resulting from the subsequent input at each acoustic sensing element of the plurality of acoustic sensing elements, wherein:

determining the second input location comprises determining the second input location using the first device acoustic signature and the second measured acoustic response at each acoustic sensing element.

\* \* \* \* \*